H. KILL.
PLANTER ATTACHMENT.
APPLICATION FILED OCT. 17, 1911.
1,017,559.
Patented Feb. 13, 1912.
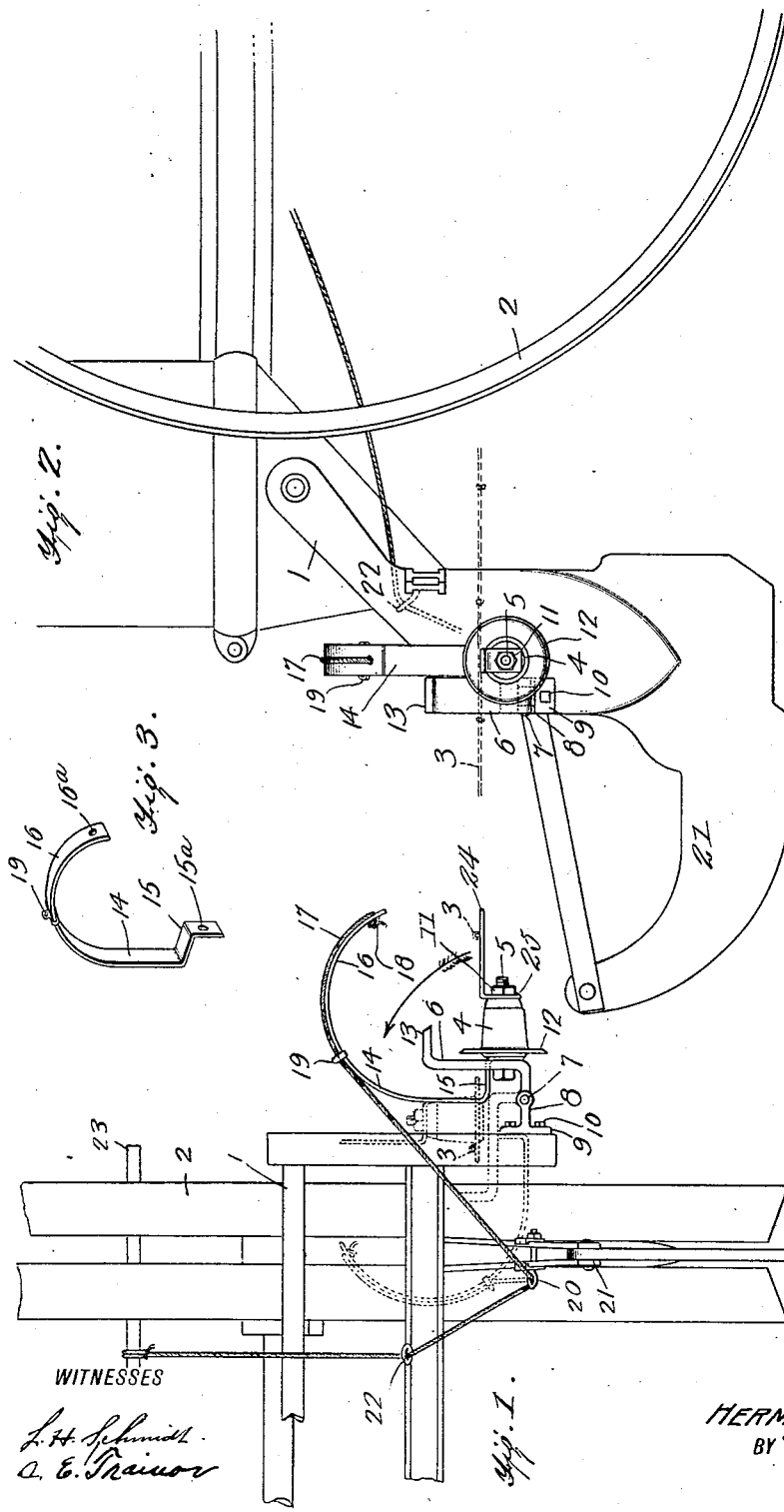
WITNESSES
INVENTOR
HERMAN KILL,
BY
ATTORNEYS

UNITED STATES PATENT OFFICE.

HERMAN KILL, OF LIBERTY, ILLINOIS.

PLANTER ATTACHMENT.

1,017,559.  Specification of Letters Patent.  Patented Feb. 13, 1912.

Application filed October 17, 1911. Serial No. 655,148.

*To all whom it may concern:*

Be it known that I, HERMAN KILL, a citizen of the United States, and a resident of Liberty, in the county of Adams, State of Illinois, have invented a new and useful Improvement in Planter Attachments, of which the following is a specification.

My invention is an improvement in attachments for planters of the check rower type, and has for its object the provision of a simple, inexpensive device for returning the wire pulley of the planter to place after it has been thrown loose to turn at the end of the row.

In the drawing: Figure 1 is a front view of the attachment in place on a planter; Fig. 2 is a side view of Fig. 1; and Fig. 3 is a perspective view of the attachment removed.

The present embodiment of the invention is shown attached to the frame 1 of a planter 2 of the check rower type, wherein the dropping mechanism is actuated by the knotted wire 3. The wire 3 passes over a pulley 4 journaled on a stub shaft 5 held in an arm 6 hinged at 7 to a bracket 8, which is provided with a base 9 secured to the planter frame by bolts 10. The pulley is held on the shaft by a nut 11 and is provided with an annular marginal flange 12 at its inner end.

The arm 6 is provided at its upper end with a lateral lug or extension 13 which overhangs the pulley, and the pulley may take the full line position of Fig. 1 to release the wire, or the dotted line position to hold the wire in position to actuate the dropping mechanism of the planter. When the end of a row is reached by the planter the pulley which has been in the dotted line position of Fig. 1 is dropped into the full line position to release the wire, and when the planter is ready to commence the next row the pulley must be replaced by hand. To eliminate this operation an arm 14 is provided (Fig. 3) having at one end a laterally offset portion 15 provided with an opening 15ª for receiving the shaft 5. The portion 15 encircles the shaft between the pulley and the bracket arm 6, and the upper end of the arm is in the form of an arch 16 which extends beyond the outer end of the pulley, as shown.

A cord 17 has one of its ends passed through an opening 16ª near the free end of the arm, and the said end of the cord is knotted, as indicated at 18, to prevent its withdrawal from the opening. The cord is laid along the upper face of the arched portion of the arm and is held in place by an eye 19 near the inner end of the said arched portion. From the eye 19 the cord passes through another eye 20 on the runner or furrow opener 21 of the planter, and from thence through an eye 22 on the frame to a lever 23, to which the other end of the cord is attached.

It will be evident that when the cord is pulled toward the operator the arm 15—16 will be swung over into the dotted line position of Fig. 1, bringing the bracket arm 6 and the pulley 4 into position for properly holding the wire.

A guide in the form of a bar 24 is provided with an angular portion 25, having an opening for receiving the shaft 5, and the said portion 25 is arranged between the outer end of the pulley and the nut 11, and with the bar 24 extending horizontally outward. The guide holds the wire and guides it back onto the pulley. The cord is so arranged that it is easily accessible to the operator, and the portion 13 of the bracket arm 6 prevents the wire from escaping from the pulley, should it slip off the flange 12.

I claim:

1. In a check rower, the combination with the wire pulley, and the bracket arm hinged to the planter for swinging the pulley with its axis in vertical or horizontal position, of an arm secured to the bracket arm and provided with an arched portion at its free end extending longitudinally above the pulley, a cord having one of its ends secured to the arm near its free end and the other end adjacent to the operator, eyes on the arm and the planter for guiding the cord, and a guide for the wire extending longitudinally of the pulley at the outer end thereof for guiding the wire to the pulley.

2. In a check rower, the combination with the wire pulley, and the bracket arm hinged to the planter for swinging the pulley with its axis in vertical or horizontal position, of an arm secured to the bracket arm and provided with an arched portion at its free end extending longitudinally above the pulley, a cord having one of its ends secured to the arm near its free end and the other end adjacent to the operator, eyes on the arm and the planter for guiding the cord.

3. In a check rower, the combination with the wire pulley, and the bracket arm hinged to the planter for swinging the pulley with its axis in vertical or horizontal position, of an arm secured to the bracket arm and provided with an arched portion at its free end extending longitudinally above the pulley, and a cord having one end secured to the arm near its free end for swinging the pulley.

4. In a planter of the check rower type, the combination with the wire pulley and the mounting for the same for permitting the pulley to be swung with its axis horizontal or vertical, of an arm secured at one end to the mounting, the free end of the arm extending longitudinally of the pulley, and a cord having one end secured to the arm near its free end, and a guide bar on the outer side of the pulley and extending longitudinally thereof.

5. In a planter of the check rower type, the combination with the wire pulley and the mounting for the same for permitting the pulley to be swung with its axis horizontal or vertical, of an arm secured at one end to the mounting, the free end of the arm extending longitudinally of the pulley, and a cord having one end secured to the arm near its free end.

6. An attachment of the character specified, comprising an arm having at one end means whereby it may be attached to the planter, the other end of the arm being arched and extending at substantially a right angle with respect to the body of the arm, said arm having an opening near its free end for the attachment of a cord.

HERMAN KILL.

Witnesses:
S. A. HUBBARD,
H. E. SCHMIEDESKAMP.

---

Copies of this patent may be obtained for five cents each, by addressing the "Commissioner of Patents, Washington, D. C."